(12) United States Patent
Nishimura et al.

(10) Patent No.: US 10,305,342 B2
(45) Date of Patent: May 28, 2019

(54) MOTOR

(71) Applicant: Mitsubishi Electric Corporation, Tokyo (JP)

(72) Inventors: Shinji Nishimura, Tokyo (JP); Shinsuke Kayano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 682 days.

(21) Appl. No.: 14/898,201

(22) PCT Filed: Oct. 8, 2013

(86) PCT No.: PCT/JP2013/077291
§ 371 (c)(1),
(2) Date: Dec. 14, 2015

(87) PCT Pub. No.: WO2015/019507
PCT Pub. Date: Feb. 12, 2015

(65) Prior Publication Data
US 2016/0126797 A1    May 5, 2016

(30) Foreign Application Priority Data

Aug. 9, 2013   (JP) ................................ 2013-165948

(51) Int. Cl.
*H02K 5/02* (2006.01)
*H02K 3/12* (2006.01)
(Continued)

(52) U.S. Cl.
CPC ............... *H02K 5/02* (2013.01); *B60L 11/08* (2013.01); *H02K 1/274* (2013.01); *H02K 3/12* (2013.01);
(Continued)

(58) Field of Classification Search
CPC  H02K 5/02; H02K 1/274; H02K 3/12; H02K 3/28; H02K 5/161; H02K 7/006;
(Continued)

(56) References Cited

U.S. PATENT DOCUMENTS 5,442,250 A * 8/1995 Stridsberg ............ B60K 7/0007
310/186
6,137,203 A * 10/2000 Jermakian ............ H02K 1/2793
310/191

FOREIGN PATENT DOCUMENTS

CN          1588759 A     3/2005
JP          05-95190 U    12/1993
(Continued)

OTHER PUBLICATIONS

International Search Report of PCT/JP2013/077291 dated Dec. 3, 2013.
(Continued)

*Primary Examiner* — Mohamad A Musleh
(74) *Attorney, Agent, or Firm* — Sughrue Mion, PLLC; Richard C. Turner

(57) ABSTRACT

A motor, which can reduce a shaft current by a cheap configuration and has a high reliability, is provided. A motor which is provided between an internal combustion engine and a transmission and installed in a housing for connecting the internal combustion engine and the transmission, in which a number of magnetic poles of a rotor is "10×n" (n is a natural number), and a number of teeth of a stator is "12×n" (n is a natural number); and a rotary shaft of the rotor, bearings for supporting the rotary shaft, and the housing are composed of electric conductors; and an electric conductor circuit, which includes the rotary shaft, the bearings, and the housing and is interlinked to the stator, is formed.

6 Claims, 4 Drawing Sheets

(51) Int. Cl.
*H02K 7/00* (2006.01)
*H02P 25/22* (2006.01)
*H02P 27/06* (2006.01)
*B60L 11/08* (2006.01)
*H02K 1/27* (2006.01)
*H02K 3/28* (2006.01)
*H02K 5/16* (2006.01)
*H02K 11/00* (2016.01)

(52) U.S. Cl.
CPC .............. *H02K 3/28* (2013.01); *H02K 5/161* (2013.01); *H02K 7/006* (2013.01); *H02K 11/0094* (2013.01); *H02P 25/22* (2013.01); *H02P 27/06* (2013.01); *B60L 2220/54* (2013.01); *B60L 2270/145* (2013.01); *H02K 2213/03* (2013.01); *Y02T 10/641* (2013.01); *Y02T 10/642* (2013.01); *Y02T 10/70* (2013.01); *Y02T 10/7077* (2013.01)

(58) Field of Classification Search
CPC . H02K 11/0094; H02K 2213/03; B60L 11/08; B60L 2220/54; B60L 2270/145; H02P 25/22; H02P 27/06; Y02T 10/641; Y02T 10/642; Y02T 10/70; Y02T 10/7077
See application file for complete search history.

(56) References Cited

FOREIGN PATENT DOCUMENTS

| | | | |
|---|---|---|---|
| JP | 10-322960 A | 12/1998 | |
| JP | 1416254 A1 * | 5/2004 | ........... G01D 5/2046 |
| JP | 2005300410 A * | 10/2005 | ........... G01D 5/2046 |
| JP | 2006-211862 A | 8/2006 | |
| JP | 2008-148453 A | 6/2008 | |
| JP | 2010-221775 A | 10/2010 | |
| JP | 2012-019580 A | 1/2012 | |
| JP | 2012-120248 A | 6/2012 | |
| WO | 2007/075148 A1 | 7/2007 | |

OTHER PUBLICATIONS

Communication dated Mar. 21, 2018 from the State Intellectual Property Office of the P.R.C. in counterpart application No. 201380078782.4.

Communication dated May 2, 2017, issued from the State Intellectual Property Office of People's Republic of China in counterpart Application No. 201380078782.4.

Communication dated Oct. 20, 2017 from the State Intellectual Property Office of the P.R.C. in counterpart application No. 201380078782.4.

* cited by examiner

MOTOR

CROSS REFERENCE TO RELATED APPLICATIONS

This is a National Stage of International Application No. PCT/JP2013/077291 filed Oct. 8, 2013, claiming priority based on Japanese Patent Application No. 2013-165948 filed Aug. 9, 2013, the contents of all of which are incorporated herein by reference in their entirety.

BACKGROUND OF THE INVENTION

Technical Field

The present invention relates to a motor which is linked between an internal combustion engine and a transmission.

Background Art

In a conventional motor, various countermeasures are performed in order to prevent electrolytic corrosion of a bearing, which is caused by a shaft current which is passed through in accordance with a shaft voltage of a rotor.

For example, a high-permeability portion is provided at a part of a shaft, whereby a shaft current is not passed through a bearing (for example, refer to Patent Document 1). Moreover, an insulating ring is fitted to an outer ring of a bearing so as to be electrically insulated, whereby degradation of the bearing, which is caused by a shaft current, is prevented (for example, refer to Patent Document 2). Moreover, a part of a shaft is made of a resin (for example, refer to Patent Document 3). Furthermore, a stator is covered by a resin, whereby the stator is insulated at an outer side of the stator (for example, refer to Patent Document 3).

CONVENTIONAL ART DOCUMENT

Patent Document

Patent Document 1: Japanese Laid-Open Patent Publication No. 2006-211862

Patent Document 2: Japanese Laid-Open Patent Publication No. 2008-148458

Patent Document 3: Japanese Laid-Open Patent Publication No. 2012-19580

Patent Document 4: Japanese Laid-Open Patent Publication No. 2012-120248

SUMMARY OF THE INVENTION

Problems to be Solved by the Invention

In a conventional motor, in order to prevent electrolytic corrosion of a bearing, which is caused by a shaft current, a high-permeability portion is provided at a part of a shaft, or an insulating ring is fitted to an outer ring of a bearing an as to be electrically insulated, so that there has been a defect in which an expensive component is required. Moreover, in a conventional motor which is disposed among an internal combustion engine, a transmission, and a reduction gear, there has been a problem in that bearings which hold a motor shaft, in particular, all bearings which hold one end portion of the motor shaft must be insulated.

Moreover, in a conventional motor in which a part of a shaft is ma e of a resin, strength of the shaft is decreased, so that there has been a problem in that reliability of the shaft, which is connected to an internal combustion engine, is decreased. Moreover, in a conventional motor in which a stator is covered by a resin, and the motor is insulated at an outer side of the stator, there have been problems in that heavy devices, such as an internal combustion engine and a transmission, must be held, and the stator must be endured against a vibration of the internal combustion engine, and a strength of the stator is decreased.

Moreover, for example, in a conventional motor which is connected between an internal combustion engine and a transmission, a loop, which is composed of electric conductors, such as, a rotary shaft, a bearing, a housing, a bearing, and a rotary shaft, is formed, and when a magnetic flux in a circumferential direction is varied at a stator which is interlinked to the loop, an electromotive force is generated in the loop, and an electric current is passed through.

In particular, when an oil film is made from oil or grease which is used as a lubricant, it is considered that the bearing is used as an insulation component. However, when the oil film is thinned by a vibration of the internal combustion engine or a radial force applied to the shaft, an electric current is passed through, and when the electric current is interrupted, a spark is produced, whereby electrolytic corrosion is produced on a surface of the bearing.

The present invention has been made to solve above-described problems, and an object of the invention is to provide a motor which can reduce a shaft current by a cheap configuration, and has a high reliability.

Means for Solving Problems

A motor of the present invention is provided between an internal combustion engine and a transmission and installed in a housing for connecting the internal combustion engine and the transmission, in which a number of magnetic poles of the rotor is "10×n" (n is a natural number), and a number of the teeth of the stator is "12×n" is a natural number); and the rotary shaft of the rotor, the bearings for supporting the rotary shaft, and the housing are composed of electric conductors; and an electric conductor circuit, which includes the rotary shaft, the bearings, and the housing and is interlinked to the stator, is formed.

Effects of the Invention

According to the present invention, a motor, which can reduce a shaft current by a cheap configuration and has a high reliability, can be obtained.

An object, a characteristic, and an effect of the present invention will be more clearly described by the explanations and the descriptions of the drawings in the following embodiment.

MODE FOR CARRYING OUT THE INVENTION

Hereinafter, a motor according to Embodiment 1 of the present invention will be explained in reference to drawings.

In addition, reference symbols, which are the same as those in each of FIG. 1 through FIG. 4, refer to the same or equivalent parts.

Embodiment 1

Figure 1:
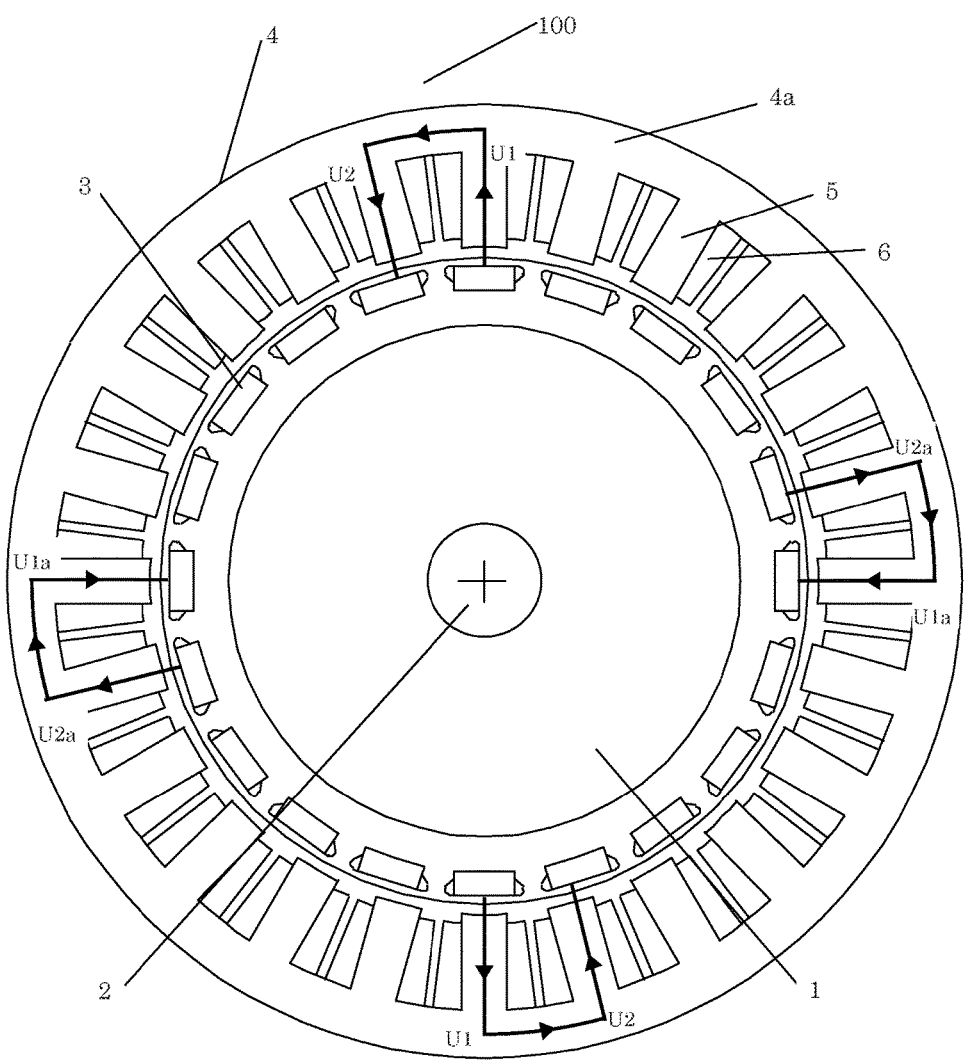
FIG. 1 is a cross-sectional view illustrating a cross section of a main portion in a plain being vertical with respect to a rotary shaft of a motor according to Embodiment 1 of the present invention.
Figure 2:
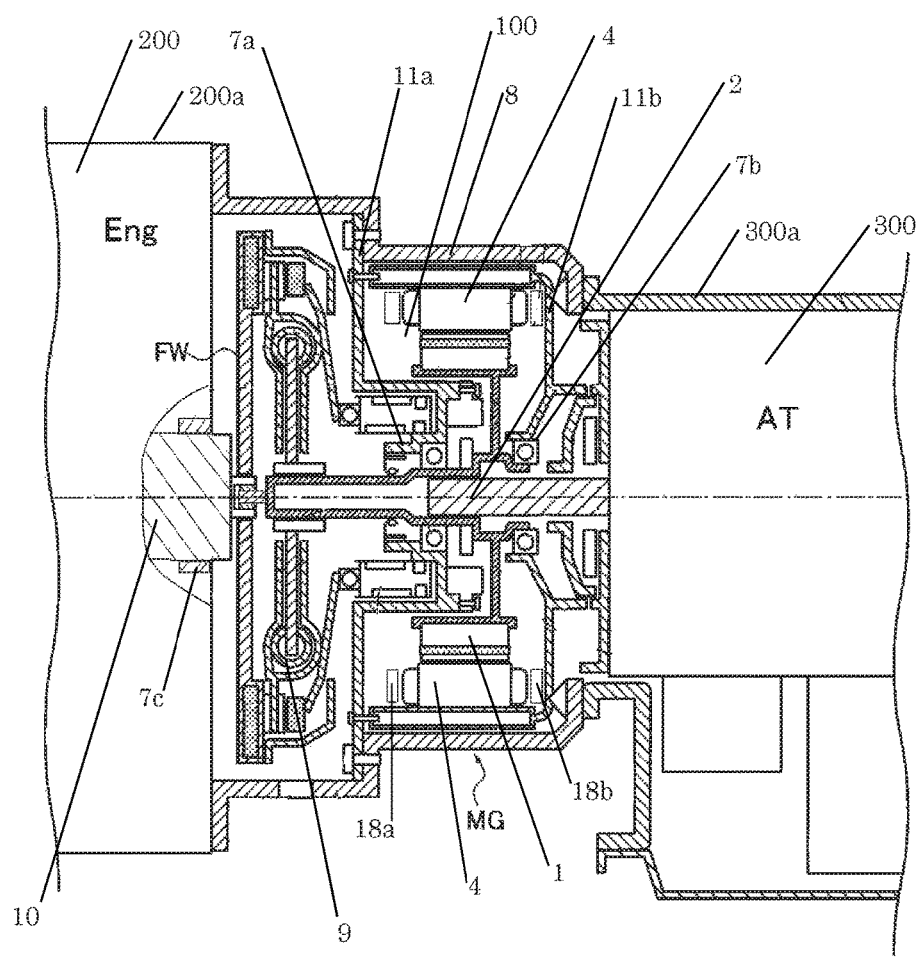
FIG. 2 is a cross-sectional view illustrating the motor according to Embodiment 1 of the present invention.
Figure 3:
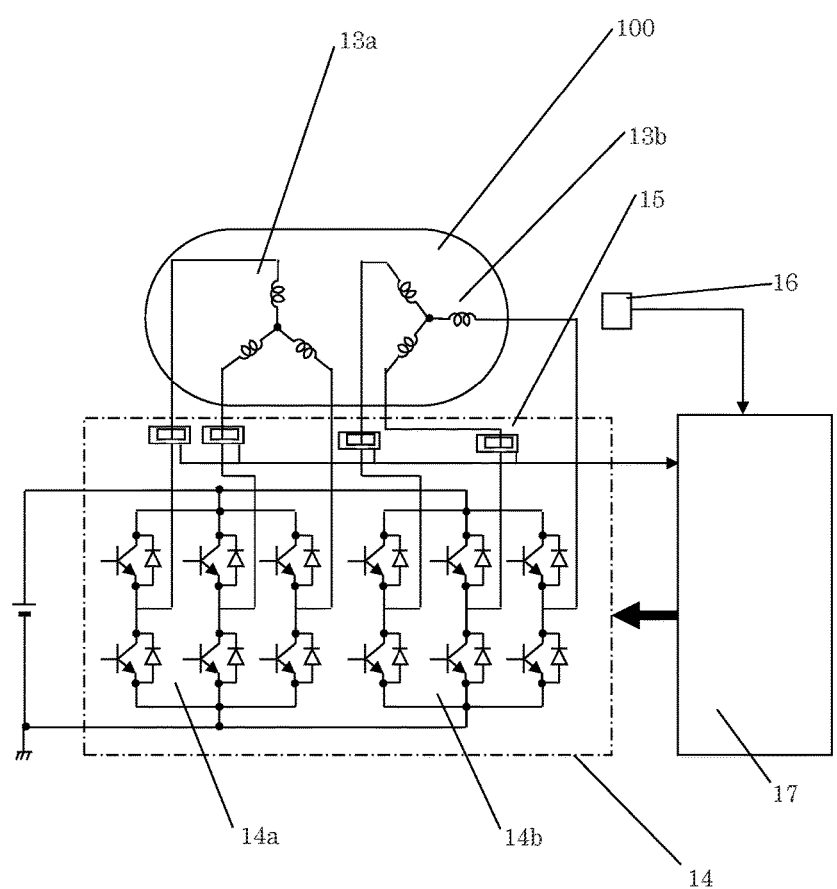
FIG. 3 is a block diagram illustrating a driving circuit of the motor according to Embodiment 1 of the present invention.
Figure 4:
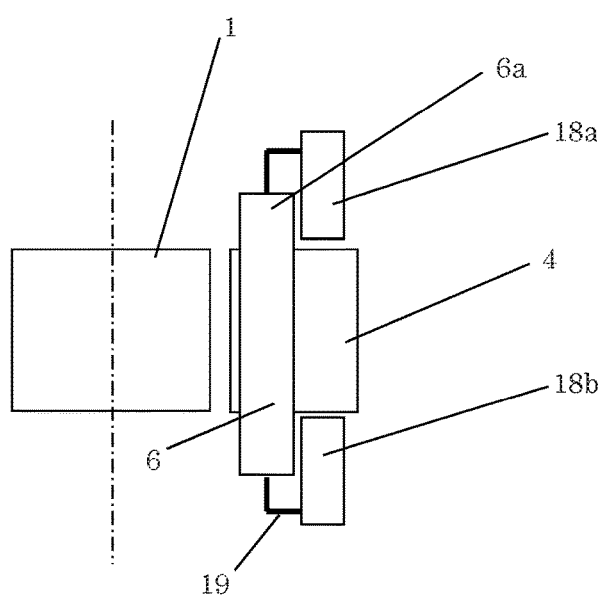
FIG. 4 is a schematic diagram illustrating the motor according to Embodiment 1 of the present invention.

FIG. 1 is a cross-sectional view illustrating a stator and a rotor of a motor according to Embodiment 1 of the present invention, and FIG. 2 is a side cross-sectional view of the motor, and FIG. 3 is a driving circuit diagram of the motor, and FIG. 4 is a schematic diagram illustrating a lead portion of a stator winding of the motor.

Firstly, a configuration of the motor according to Embodiment 1 of the present invention will be explained in reference to FIG. 1 through FIG. 4.

As illustrated in FIG. 1, a rotor 1 of a motor 100 includes a rotary shaft 2 at a central portion of the rotor 1, and magnetic poles 3, to which a permanent magnet is attached, are provided at an outer circumference of the rotor 1. A stator 4 is arranged around the rotor 1 in a state where a gap is maintained between the stator 4 and the rotor 1. Teeth 5 are provided at the stator 4 so as to face the magnetic poles 3, and a winding 6 is intensively wound around each of the teeth 5.

As illustrated in FIG. 2, one end portion of the rotary shaft 2 of the rotor 1 of the motor 100 is held to a housing 8 by a bearing 7a, and the one end portion is fixed to a crank shaft 10 of an internal combustion engine 200 via a clutch 9, and the crank shaft 10 is held by a bearing 7c of the internal combustion engine 200.

The other end portion of the rotary shaft 2 is held to the housing 8 by a bearing 7b, and the other end portion is connected to a transmission 300 (including a reduction gear).

The housing 8 of the motor 100 holds the stator 4, in a state where one end surface of the housing 8 is fixed to a case 200a of the internal combustion engine 200, and the other end surface of the housing 8 is fixed to a case 300a of the transmission 300.

The rotary shaft 2 is made of iron, and the rotary shaft 2 has conductivity.

One end portion in a shaft direction of the rotary shaft 2 is rotatably held to the housing 8 having conductivity by the bearing 7a having conductivity via a frame 11a having conductivity and the other end portion in the axial direction of the rotary shaft 2 is rotatably held to the housing 8 having conductivity by the bearing 7b having conductivity via a frame 1ib having conductivity.

The crank shaft 10 is made of iron, and the crank shaft 10 has conductivity.

A sliding bearing is used for the bearing 7c of the internal combustion engine 200, and the bearing 7c has conductivity.

The case 200a of the internal combustion engine 200 is made of iron, and the case 200a has conductivity.

The case 300a of the transmission 300 is made of aluminum, and the case 300a has conductivity.

The case 300a of the transmission 300 holds a shaft of the transmission 300 by a ball bearing (not illustrated). The ball bearing and the shaft of the transmission 300 are made of iron, and those have conductivity.

The shaft of the transmission 300 is connected to the rotary shaft 2 by a spline.

As described above, an electric conductor circuit is formed via the rotary shaft 2, the bearing 7a, the bearing 7b, and the housing 8, in which all components have conductivity and the electric conductor circuit is interlinked to the stator 4 having an annular shape.

An electric conductor circuit is formed via electric conductors such as the internal combustion engine 200, a bearing of the internal combustion engine 200, and the case 200a of the internal combustion engine 200.

An electric conductor circuit is similarly formed at the transmission side via electric conductors such as the transmission 300, a bearing of the transmission 300, and the case 300a of the transmission 300.

Therefore, when the motor is insulated at the bearing, it is required that the bearing in the internal combustion engine 200 or the transmission 300 is insulated.

In the present invention, the motor includes two pairs of three-phase windings of which electric phases are different from each other, and magnetic fluxes in a circumferential direction of the stator 4 are generated at symmetric positions in a reverse direction, no that the magnetic fluxes are compensated. As a result, the magnetic fluxes in a circumferential direction of the stator 4 become zero, and an electromotive force is not generated in the electric conductor circuit, so that an electric current is not passed through the bearing, and a useful life of the bearing can be improved.

In a specific configuration, a number of the magnetic poles of the rotor 1 is "10×n" (n is a natural number), and a number of the teeth 5 of the stator 4 is "12×n" (n is a natural number). As illustrated in FIG. 1 according to Embodiment 1, a number of the magnetic poles 3 of the rotor 1 is 20, and a number of the teeth 5 of the stator 4 is 24.

Windings U1, U2, V1, V2, W1, and W2 are sequentially provided from the first teeth at the teeth 5 of the stator 4.

In this case, the windings U1, V1, and W1 compose a first three-phase winding, and the windings U2, V2, and W2 compose a second three-phase winding.

Electric angle phases of the first three-phase winding and the second three-phase winding, which compose the windings of the stator 4, are deviated at 30 degrees from each other.

A magnetic flux flow of U phase is indicated in FIG. 1.

When the motor 100 is configured in a state where a number of the magnetic poles 3 of the rotor 1 is 10 and a number of the teeth 5 of the stator 4 is 12, a circumferential magnetic flux is flowed in a reverse direction at a core back portion 4a of the windings U1 and U2 and the windings U1a and U2a, so that a circumferential magnetic flux is not generated in the whole stator 4. Therefore, an electric current is not passed through the baring.

As illustrated in FIG. 3, a first three-phase inverter 14a is connected to a first three-phase winding 13a, and a second three-phase inverter 14b is connected to a second three-phase winding 13b.

Electric angle phases of the first three-phase inverter 14a and the second three-phase inverter 14b are deviated at 30 degrees from each other, and an electric current is passed through in accordance with a phase of an electromotive force which is generated by the magnetic poles 3 of the rotor 1.

Thereby the motor 100 can be operated in a state where a torque ripple is small.

A cogging torque is very small in a state where a cycle is a $2\pi/12$ electric angle.

When a torque is varied, a large load is applied to the bearing, and an oil film becomes small, and a shaft current is easily passed through. However, the torque ripple is small in the motor 100 according to Embodiment 1, so that the oil film of the bearing can be maintained.

Even when a shaft voltage is generated due to working accuracy or the like, a shaft current can be reduced by the oil film.

In FIG. 3, the motor 100 is driven and controlled by a control circuit 17 in accordance with detection values which are inputted from a current sensor 15 which detects an electric current of an inverter 14, and a rotation sensor 16 which detects a number of revolutions of the rotor 1.

In the other connecting configuration of the windings, the windings U1, U2, V1, V2, W1, and W2 are sequentially provided from the first teeth at the teeth 5 of the stator 4, and the windings U1 and U2, V1 and V2, and W1 and W2 are connected in series in a state where the winding directions are reverse each other (single three-phase connection for 10 magnetic poles and 12 slots).

In this configuration, magnetic fluxes in a circumferential direction of the stator 4 are generated in a reverse direction at symmetric positions, so that the magnetic fluxes are compensated. As a result, the magnetic fluxes in a circumferential direction of the stator become zero, and an electromotive force is not generated in the electric conductor circuit, so that an electric current is not passed through the bearing, and a useful life of the bearing can be improved.

Moreover, one of three-phase inverters is required in this configuration, so that the connecting configuration of the windings is simple.

Moreover, as illustrated in FIG. 4, a first wire-connection plate 18a, which is used as a first wire-connection portion composing a connecting portion for connecting the first three-phase winding 13a in parallel, is arranged at the internal combustion engine side (upper side in FIG. 4) in an axis direction of the stator 4, and a second wire-connection plate 18b, which is used as a second wire-connection portion composing a connecting portion for connecting the second three-phase winding 13b in parallel, is arranged at the transmission side (lower side in FIG. 4) in the axis direction of the stator 4.

Thereby, lead portions 19 of the winding 6 of the stator 4 are led every other teeth at the internal combustion engine side and the transmission side. As a result, the lead portions 19 are not closed to the connecting portion of the wire-connection plate 18a and the wire-connection plate 18b in a circumferential direction, so that connection work by a welding process can be easily performed.

Moreover, the wire-connection plates 18a and 18b are separated at two positions, so that the wire-connection plates 18a and 18b can be formed in a small size, and a size in an axis direction of the motor 100, which is sandwiched between the transmission 300 and the internal combustion engine 200 of which attachment space is severe (narrow), can be reduced.

As described above, in the motor 100 according to Embodiment 1, the wire-connection plates 18a and 18b can be downsized. Moreover, in a sandwich-type hybrid vehicle in which a size limitation is severe, a size of the motor 100 can be minimized.

The windings, which should be connected, are disposed every other teeth, so that the connecting portion is separated (not closed), and the connecting portion can be easily welded, for example, when the connecting portion is welded and connected.

Moreover, when the wire-connection plates 18a and 18b are disposed at the outer side in a radial direction of a winding end portion 6a, an area, at which the wire-connection plates 18a and 18b and the winding end portion 6a are overlapped, are increased (at both sides), so that an area, which is protruded from the winding end portion 6a, is reduced.

The present invention is not limited to the above-described embodiment, and it is possible in the scope of the present invention that the embodiment is suitably modified or omitted.

What is claimed is:

1. A motor which is provided between an internal combustion engine and a transmission and installed in a housing for connecting the internal combustion engine and the transmission, comprising:
   a rotor on which a plurality of permanent magnets are arranged in a circumferential direction;
   a stator which is held by the housing so as to be arranged around the rotor, and the stator includes a plurality of teeth which are arranged in a state where a gap is maintained between the teeth and the rotor;
   a winding which is wound around each of the teeth of the stator;
   a connecting portion for connecting the winding; and
   bearings which are held by the housing so as to support a rotary shaft of the rotor; wherein
   a number of magnetic poles of the rotor is "10×n" (n is a natural number), and a number of the teeth of the stator is "12×n" (n is a natural number); and the rotary shaft of the rotor, the bearings, and the housing are composed of electric conductors; and an electric conductor circuit, which includes the rotary shaft, the bearings, and the housing and is interlinked to the stator, is formed.

2. The motor as recited in claim 1, wherein the winding of the stator includes a first three-phase winding, and a second three-phase winding of which an electric angle phase is deviated at 30 degrees from an electric angle phase of the first three-phase winding.

3. The motor as recited in claim 1, wherein the connecting portion includes a first connecting portion which connects a first three-phase winding to one end portion in a shaft direction of the stator, and a second connecting portion which connects a second three-phase winding to the other end portion in the shaft direction of the stator.

4. The motor as recited in claim 2, wherein the connecting portion includes a first connecting portion which connects the first three-phase winding to one end portion in a shaft direction of the stator, and a second connecting portion which connects the second three-phase winding to the other end portion in the shaft direction of the stator.

5. The motor as recited in claim 1, wherein each of the winding around each of the teeth of the stator is configured such that windings arranged at symmetric positions with respect to the rotor shaft generate magnetic fluxes in reverse directions.

6. The motor as recited in claim 5, wherein the winding comprises a first three-phase winding U1, V1, and W1, and a second three-phase winding U2, V2, and W2, and
   wherein the windings U1, U2, V1, V2, W1, and W2 are sequentially provided from first teeth of the stator, each pair of windings U1 and U2, V1 and V2, and W1 and W2, respectively, being connected in series in a state where the winding directions are reverse each other.

* * * * *